Figure 1:
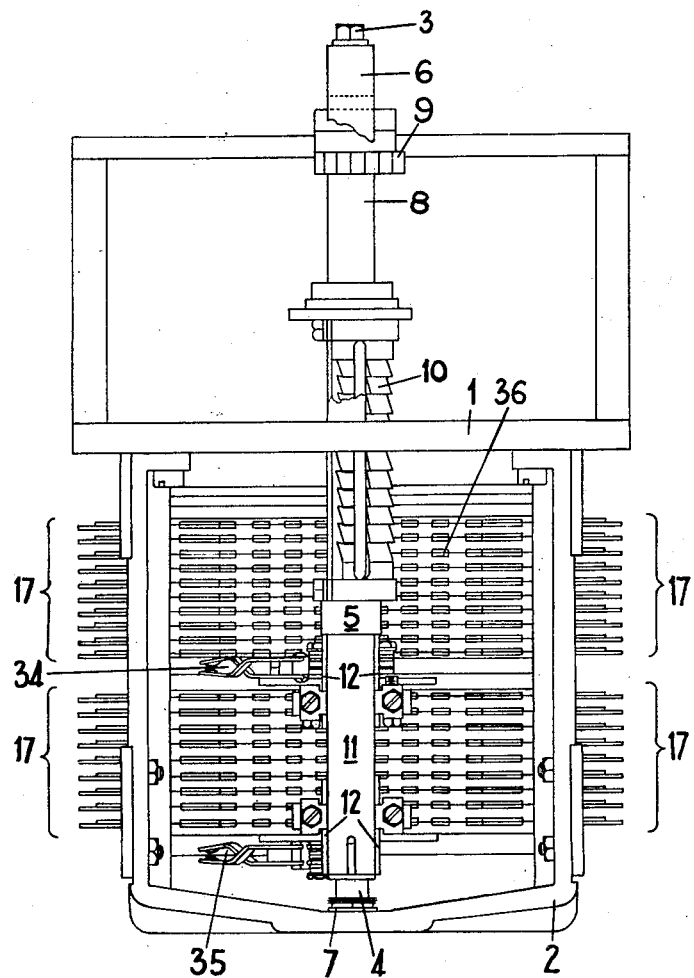

July 16, 1957  W. R. ROSE  2,799,755
CONTACT WIPER ASSEMBLIES FOR ELECTROMAGNETIC
STEP-BY-STEP SWITCHES
Filed Aug. 24, 1954  3 Sheets-Sheet 1

INVENTOR
WILLIAM ROBERT ROSE
BY
ATTORNEY

July 16, 1957  W. R. ROSE  2,799,755
CONTACT WIPER ASSEMBLIES FOR ELECTROMAGNETIC
STEP-BY-STEP SWITCHES
Filed Aug. 24, 1954  3 Sheets-Sheet 2

INVENTOR
WILLIAM ROBERT ROSE
BY
ATTORNEY

United States Patent Office 2,799,755
Patented July 16, 1957

2,799,755

CONTACT WIPER ASSEMBLIES FOR ELECTRO-MAGNETIC STEP-BY-STEP SWITCHES

William Robert Rose, Coventry, England, assignor to The General Electric Company Limited, London, England Application August 24, 1954, Serial No. 451,811

7 Claims. (Cl. 200—171)

The present invention relates to contact wiper assemblies for electro-magnetic step-by-step switches.

Two co-ordinate switches of this type usually comprise a shaft which is arranged to be rotated in step-by-step fashion by means of an electro-magnet. The shaft is also arranged to be given translatory motion, in step-by-step fashion, by means of another electro-magnet. This movement in either of two co-ordinates is for the purpose of causing engaging between contact wipers carried by the switch shaft and contacts of a bank with which the wiper tips may co-operate. In such a bank the contacts are arranged in rows which correspond one to each step of the said translatory motion.

A contact bank of this character is necessarily of complex construction comprising a large number of parts each part having its own individual set of manufacturing tolerances. Consequently even though the switch mechanism is capable of positioning the wipers accurately at a point where the commencement of a contact row should be, the plane of the row may not be exactly where required owing to the errors resulting from said manufacturing tolerances being cumulative. It is therefore desirable to ensure that the wiper tips, of which there are usually two, are permitted a certain freedom of movement in a direction that is substantially perpendicular to the planes of the contact rows.

A form of wiper assembly which permits a certain amount of tolerance in the position of a contact row relative to its true position is described in British patent specification No. 657,409. However in the wiper assembly described in the quoted specification the wiper blades have a relatively short length from the wiper tip to their point of fixture with the result that if the wiper tips engage with a contact row which is appreciably displaced from its true position, the contact pressure of the two wiper tips tend to be dissimilar. This dissimilarity of contact pressure is undesirable.

It is one object of the present invention to provide improved forms of contact wiper assembly for an electro-magnetic step-by-step switch, in which the above mentioned difficulty is largely overcome.

According to the present invention a contact wiper assembly for an electro-magnetic step-by-step switch comprises two suitably spaced wiper blades, each of said blades comprising a first portion which is fixed at one end to a wiper carriage, the free end of said first portion of each blade being provided with a second portion which projects so that, when the wiper assembly is mounted on a switch, it extends generally in an inward direction towards the switch shaft and a third portion which extends generally in an outward direction away from the switch shaft and which carries a wiper tip, the separation between said second portions of the two blades being maintained substantially constant by means of a suitable spacing device such as a rivet or block.

Preferably said third portions of the two blades are arranged to overlap or cross one another at some intermediate point in their length. With such an arrangement, a projection or stud may be provided on one or each of the two blades between the cross-over point and said spacing device, the projection or stud on one blade being arranged to bear against the corresponding projection of the stud on the other blade or with the other blade itself at least when the wiper tips are urged apart.

Alternatively the said spacing device may be provided with a part which extends outwardly towards the cross-over point and which lies between the wiper blades, the arrangement being such that the outwardly extending part of said spacing device bears against a part of each wiper blade portion between said spacing device and said cross-over point at least when the wiper tips are urged apart.

The said first portion of each blade may be arranged to lie substantially along an arc of a circle which is concentric with the switch shaft.

Figure 2:
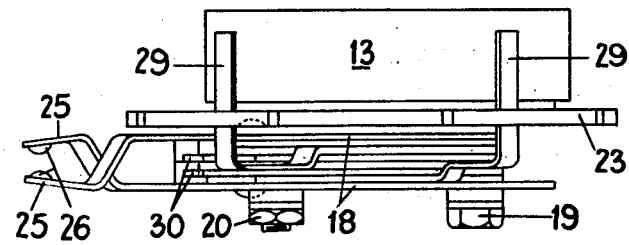
Figure 3:
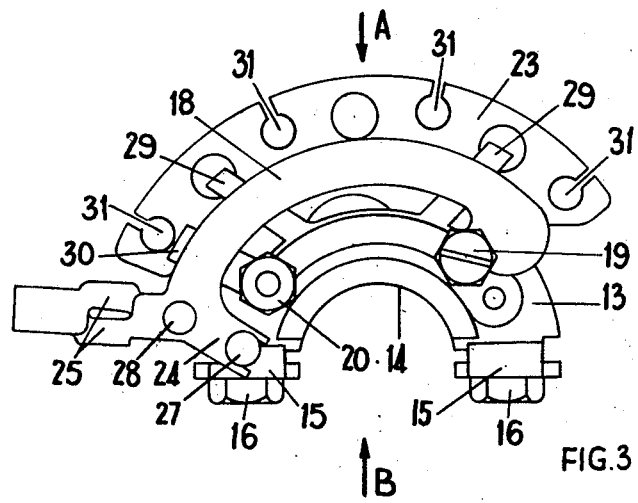
Figure 4:
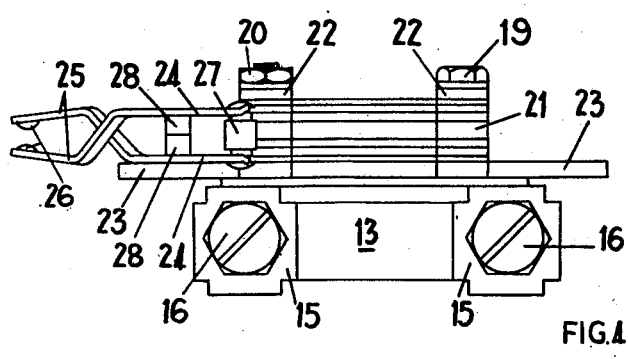
Figure 5:
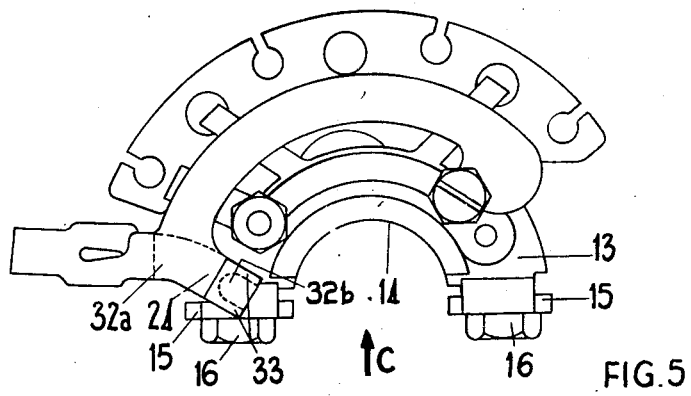
Figure 6:
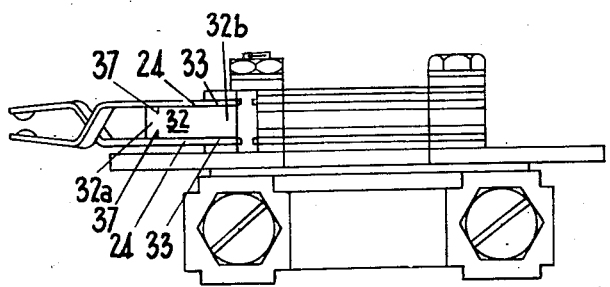

Two examples of wiper assemblies in accordance with the present invention will now be described with reference to the accompanying drawings in which:

Figure 1 shows an elevation of a two co-ordinate electro-magnetic step-by-step switch having two contact wiper assemblies, Figure 2 shows in more detail an elevation of the upper contact wiper assembly of the switch shown in Figure 1, Figures 3 and 4 are a plan view, and an elevation respectively of this contact wiper assembly, the views of Figures 2 and 4 being in the direction of the arrows A and B respectively in Figure 3, Figure 5 shows in more detail a plan view of the lower contact wiper assembly of the switch shown in Figure 1, and Figure 6 is an elevation of this contact wiper assembly in the direction of the arrow C in Figure 5.

Although two different constructions of wiper assembly are shown in Figure 1, it is usual in practice to arrange for all the wiper assemblies on a switch to be of the same kind, the two constructions merely being shown by way of illustration.

Referring now to Figure 1, the two co-ordinate switch is composed of two main parts, these being the contact bank assembly and the switch mechanism which is only partially shown and which includes the contact wiper assemblies 34 and 35. The contact bank assembly comprises a plurality of contact rows 17, the contacts 36 in each row 17 being disposed uniformly around an arc of a circle which is concentric with the switch shaft assembly. The switch mechanism is provided with a metal frame having a base plate 1. On one side of the base plate 1 is secured a U-shaped member 2 which supports one end of the switch shaft assembly. On the other side of the base plate 1 is mounted the electro-mechanical driving mechanism (not shown).

The switch shaft assembly is substantially as described in the specification of British Patent No. 631,631 and includes a shaft 4 which is secured at one end 3 to the member 6 which forms part of the switch mechanism frame. The other end 7 of the shaft 4 is secured to the U-shaped member 2. The fixed shaft 4 carries a second shaft 8 which is free to rotate, but not to slide axially thereon, while a further shaft 5 is free to slide axially on both of the shafts 4 and 8 and to rotate with the shaft 8.

The shaft 8 is provided with a ratchet 9 whereby it may be rotated in step-by-step fashion by means of an electro-mechanically actuated pawl (not shown) which is arranged to engage with the teeth on the ratchet 9. The shaft 5 comprises a cylindrical wiper carrying portion 11 and a number of frusto-conical teeth 10 whereby it may be given translatory motion in step-by-step fashion by means of a further electro-mechanically operated pawl (not shown).

The wiper carrying portion 11 of the switch shaft 5 is provided with two diametrically extending webs 12 whereby the contact wiper assemblies 34 and 35 are fixed into position on said shaft 5 in the manner to be hereafter described.

The switch is shown in its rest position, the contact wiper assemblies 34 and 35, each lying in a position which is outside and below their associated contacts 36 of the contact bank assembly. During switch setting the shaft 5 is first given translatory motion in step-by-step fashion, each step locating the wiper tips of each contact wiper assembly 34 and 35 at a position which is substantially in line with a contact row 17. On reaching the level of the desired contact row 17, the shafts 5 and 8 are rotated so that the pairs of wiper tips of each of the contact wiper assemblies 34 and 35 are stepped into the appropriate contact row 17, each pair of wiper tips making contact with opposite sides of the contact 36 in known manner.

The contact wiper assembly illustrated in Figures 2, 3 and 4 comprise a wiper carriage 13, which is of lightweight metal such as aluminium, and a wiper blade assembly. The wiper carriage 13 has a curved inner surface 14, the radius of which is substantially equal to the outer radius of the wiper carrying portion of a switch shaft, such as the portion 11 of the shaft 5 shown in Figure 1. A small plate 15 is attached by means of a screw 16 to each end of the wiper carriage 13. When the contact wiper assembly is to be mounted on a switch such as the switch shown in Figure 1, the screws 16 are slackened off and the wiper carriage 13 slipped into position on the wiper carrying portion 11 of the shaft 5, the wiper carriage 13 passing on one side of the webs 12 and the plates 15 on the other side. When the assembly is in the required position, the screws 16 are tightened and the webs 12 firmly gripped between the plate 15 of the wiper carriage 13.

A pair of wiper blades 18 are fixed to the wiper carriage 13 by means of a screw 19, and a nut 20. The member 21 acts to insulate electrically the blades 18 from one another, whilst the washers 22 and the plate 23 provide the necessary electrical insulation between the blades 18 and the wiper carriage 13. Each blade 18 extends from the fixing screw 19 substantially along an arc of a circle which is concentric with the switch shaft (not shown), and is provided at its free end with one portion 24 which extends inwardly towards the switch shaft and another portion 25 which extends outwardly and which carries a contact tip 26.

The separation between the inwardly extending portion 24 of the wiper blades 18 is maintained substantially constant by means of a rivet 27 of insulating material. The contact tip carrying portion 25 of the wiper blades 18 are arranged to over-lap or cross one another at an intermediate point in their length, and each of the blades 18 is provided with an insulating stud 28 which is located between the cross-over point and the rivet 27.

It is arranged that the separation between the wiper tips 26 is less than the thickness of the bank contacts, for example, the contact 36 in Figure 1, with which they are to co-operate. As a result the wiper tips 26 are urged apart and the two studs 28 caused to bear against one another at least during such co-operation. In view of the relatively short distance from the tips 26 to the studs 28, an appreciable contact pressure results.

Each of the wiper blades 18 is provided with a metal soldering tag 29 which passes through a hole in the insulating plate 23 and facilitates electrical connection to its wiper blade 18. As is shown in Figure 3, the outer edge of the insulating plate 23 is provided with a number of slots 31. The purpose of these slots 31 is to enable electrical conducting leads (not shown), which are soldered or otherwise connected to the tags 29, to be securely fastened to the plate 23 in such a manner that the connection between each lead and its tag 29 is not subjected to tension.

With a wiper assembly of this kind it is found in practice that the flexibility and length of the wiper blades 18 are such that their free ends tend to oscillate in unison during translatory stepping motion. Two fixed stops 30 are therefore incorporated in the wiper assembly, these stops projecting between the wiper blades 18 and near to their free ends. In this manner the extent of such oscillatory motion is limited to such a degree that the incorrect location of the wiper tips 26 at the end of a contact row 17 is prevented without unduly restricting the self-aligning action of the tips 26.

An alternative construction of contact wiper assembly is shown in Figures 5 and 6. This assembly only differs from the construction shown in Figures 2, 3 and 4 and described above insomuch as the rivet 27 and the insulating studs 28 are replaced by a block 32 of insulating material. This block 32 has two parts 32a and 32b of different thickness. One part 32b of the block is provided with slots, into which fit the U-shaped ends 33 of the inwardly extending portion 24 of the wiper blades 18, the separation between this wiper blade portion 24 being thus maintained substantially constant. The other part 32a of the block 32 extends outwardly towards the crossover point of the wiper blades 18. The thickness of this part 32a is such that its surfaces 37 are in contact with those portions of the wiper blades 18 between which it lies.

I claim:

1. In an electro-magnetic step-by-step switch having a rotatable shaft, a contact wiper assembly having a wiper carriage, means to secure the wiper carriage to the rotatable shaft, two spaced wiper blades, each of said blades including a first portion, a second portion and a third portion, said first portion being long relative to said second portion and having one end fixed to the wiper carriage and the other end free, said second portion being joined to the free end of said first portion and projecting from said free end generally in an inward direction towards the axis of rotation of the switch shaft and said third portion being joined to the free end of said first portion and projecting from said free end generally in an outward direction away from said axis of rotation, two wiper tips which are carried one by each of said third portions and which provide the contact making surfaces for said wiper assembly and a spacing device supported by said second portions and maintaining a substantially constant separation between the ends of said second portions adjacent to the switch shaft.

2. A contact wiper assembly as set forth in claim 1 wherein said first portion of each wiper blade lies generally along an arc of a circle which is concentric with the switch shaft.

3. A contact wiper assembly as set forth in claim 1 wherein at least one stop member is fixed to the wiper carriage, said stop member extending from the wiper carriage to lie between said first portions of the wiper blades at a position adjacent to the free ends of said first portions.

4. In an electro-magnetic step-by-step switch having a rotatable shaft, a contact wiper assembly having a wiper carriage, means to secure the wiper carriage to the rotatable shaft, two spaced wiper blades, each of said blades including a contact portion which is generally radial to the switch shaft and which has a contact surface at the end thereof remote from the switch shaft and an arm portion which carries said contact portion and which is long relative to the contact portion, said arm portion being fixed at one end to the wiper carriage and joined at the other end to the contact portion at an intermediate section of the length of the contact porion, and a spacing device supported by the ends of the contact portions adjacent to the switch shaft and maintaining a substantially constant separation between those ends of the contact portions.

5. In an electro-magnetic step-by-step switch having a rotatable shaft, a contact wiper assembly having a wiper carriage, means to secure the wiper carriage to the rotatable shaft, two spaced wiper blades, each of said blades including a first portion, a second portion and a third portion, said first portion being long relative to said second portion and having one end fixed to the wiper carriage and the other end free, said second portion being joined to the free end of said first portion and projecting from said free end generally in an inward direction towards the axis of rotation of the switch shaft and said third portion being joined to the free end of said first portion and projecting from said free end generally in an outward direction away from said axis of rotation, two wiper tips which are carried one by each of the said third portions and which provide the contact making surfaces for said wiper assembly and a spacing device supported by said second portions and maintaining a substantially constant separation between the ends of said second portions adjacent to the switch shaft, the said third portions of the two wiper blades crossing one another at an intermediate point in their length which point is between the said wiper tips and the free ends of said first portions.

6. A contact wiper assembly as set forth in claim 5 wherein two projections are provided one on each wiper blade, each said projection extending from that portion of the appertaining wiper blade between said spacing device and the point at which said third portions cross one another to engage the projection on the other wiper blade at least when the wiper tips are urged apart.

7. A contact wiper assembly as set forth in claim 5 wherein the said spacing device comprises a first part fixed to the ends of said second portions adjacent to the switch shaft and a second part which projects from said first part generally towards the wiper tips and which lies between the wiper blades for engagement by said second portions at least when the wiper tips are urged apart.

References Cited in the file of this patent
UNITED STATES PATENTS

| | | |
|---|---|---|
| 957,977 | Manson | May 17, 1910 |
| 2,474,233 | Deakin | June 28, 1949 |
| 2,522,715 | Graybill et al. | Sept. 19, 1950 |